United States Patent
Suzuki

[11] Patent Number: 5,817,988
[45] Date of Patent: Oct. 6, 1998

[54] WEIGHT CHECKER FOR MOLDINGS

[75] Inventor: Norikazu Suzuki, Gotenba, Japan

[73] Assignees: Sumitomo Wiring Systems, Ltd., Yokkaichi; Sumidenso Platech, Ltd., Shizuoka, both of Japan

[21] Appl. No.: 512,907

[22] Filed: Aug. 9, 1995

[30] Foreign Application Priority Data

Aug. 18, 1994 [JP] Japan .................................. 6-194414
Aug. 18, 1994 [JP] Japan .................................. 6-194415

[51] Int. Cl.$^6$ .................................................. G01G 19/52
[52] U.S. Cl. ............................................. 177/50; 177/262
[58] Field of Search .................................. 177/145, 253, 177/262, 244, 245, 50

[56] References Cited

U.S. PATENT DOCUMENTS

| | | |
|---|---|---|
| 4,755,122 | 7/1988 | Schmidt . |
| 4,832,884 | 5/1989 | Speck et al. . |
| 4,841,364 | 6/1989 | Kosaka et al. ........................... 358/101 |
| 4,904,172 | 2/1990 | Buja ........................................ 425/140 |
| 4,963,302 | 10/1990 | Heindle et al. . |
| 5,064,009 | 11/1991 | Melcher et al. ........................ 177/245 |
| 5,170,855 | 12/1992 | Kunz et al. ............................. 177/181 |
| 5,309,369 | 5/1994 | Kamiguchi et al. . |
| 5,518,389 | 5/1996 | Nonomura et al. ..................... 425/144 |

FOREIGN PATENT DOCUMENTS

| | | |
|---|---|---|
| 0 221 607 | 5/1987 | European Pat. Off. . |
| 0 326 031 | 8/1989 | European Pat. Off. . |
| 0 487 740 | 6/1992 | European Pat. Off. . |
| A 36 31 164 | 6/1987 | Germany . |
| 4-7123 | 1/1992 | Japan . |

OTHER PUBLICATIONS

Patent Abstracts of Japan, vol. 14, No. 291 (M–989) Jun. 22, 1990 & JP–A–02 092509 (Hitachi Ltd) Apr. 3, 1990.
Patent Abstracts of Japan, vol. 18, No. 618 (P–1831), Nov. 24, 1994 & JP–A–06 231327 (Konica Corp.) Aug. 19, 1994.
Patent Abstracts of Japan, vol. 16, No. 82 (M–1215), Feb. 27, 1992 & JP–A–03 266622 (Toyo Mach & Metal Co. Ltd) Nov. 27, 1991.
Patent Abstracts of Japan, vol. 15, No. 481 (M–1187), Dec. 6, 1991 & JP–A–03 207616 (Toyo Mach & Metal Co. Ltd) Sep. 10, 1991.
Patent Abstracts of Japan, vol. 10, No. 12 (P–421), Jan. 17, 1986 & JP–A–60 169738 (Orion Kasei KK) Sep 3, 1985).
Patent Abstracts of Japan, vol. 18, No. 220 (M–1595), Apr. 20, 1994 & JP–A–06 015694 (Tsubakimoto Kogyo KK) Jan. 25, 1994.

(List continued on next page.)

Primary Examiner—Michael L. Gellner
Assistant Examiner—Michael J. Hayes
Attorney, Agent, or Firm—Beveridge, Degrandi, Weilacher & Young, LLP

[57] ABSTRACT

An apparatus for measuring the weight of a molded resin article in conjunction with an injection molding cycle and judging whether the molded article is acceptable or rejective. A belt conveyor is provided below a mold for injection molding. Articles (connector housings) molded with the mold are dropped out of the mold onto the belt conveyor when the mold is opened, and transported to a weight checker by means of the belt conveyor. In the weight checker, the weight of the transported articles is measured. The measured weight is compared with a predetermined reference weight. If the measured weight is within a predetermined permissible range with respect to the reference weight, it is judged that the molded articles are acceptable, and then the molded articles are dropped into an acceptance box. On the other hand, if the measured weight is out of the predetermined permissible range with respect to the reference weight, it is judged that the molded articles possibly include a reject, and then the molded articles are dropped into a rejection box.

30 Claims, 12 Drawing Sheets

OTHER PUBLICATIONS

Patent Abstracts of Japan, vol. 10, No. 118 (M–475), May 2, 1986 & JP–A–60 247536 (Nitsusei Jiyushi Kogyo KK) Dec. 7, 1985.

Patent Abstracts of Japan, vol. 16, No. 405 (M–1301), Aug. 26, 1992 & JP–A–04 135724 (Toyo Mach & Metal Co., Ltd) May 11, 1992.

Kunststoffe, vol. 81, No. 5, 1 May 1991 Munchen, pp. 394–397, XP 000287460 Ackermann R 'Spritzgiessen Mit Aktiver Qualitatsueberwachung'.

F I G. 4
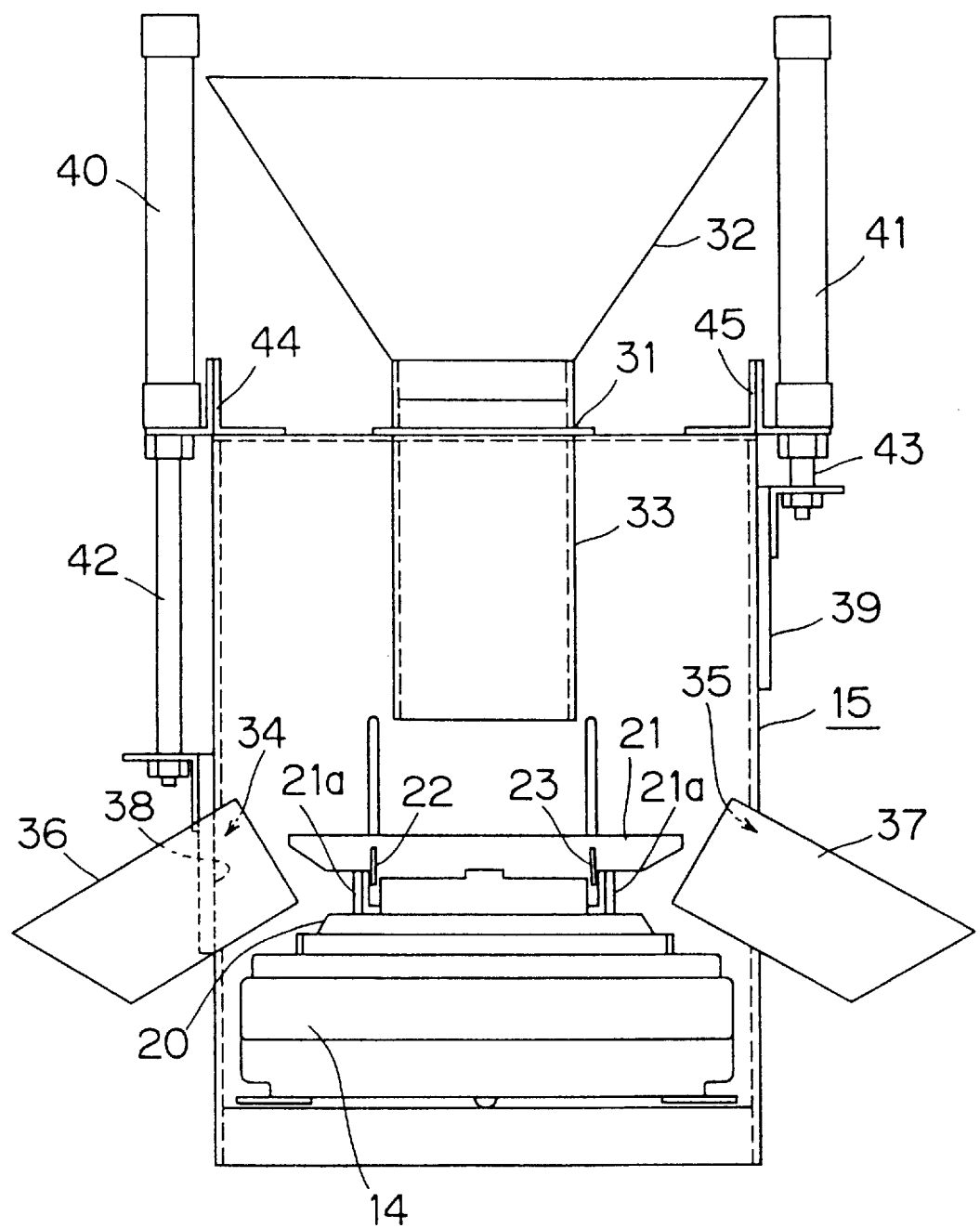

F I G. 5
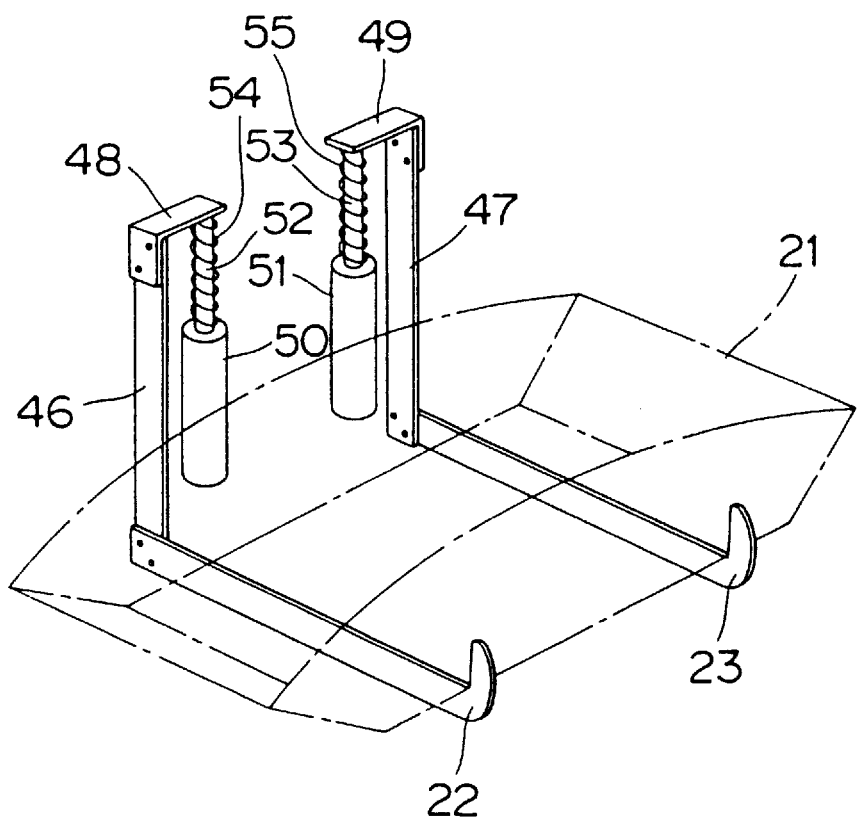

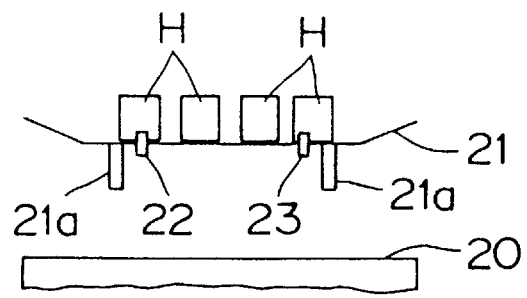
F I G. 6 A
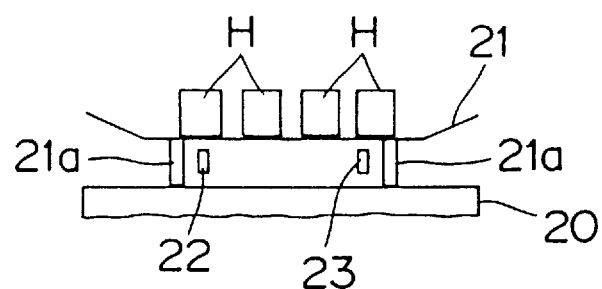
F I G. 6 B
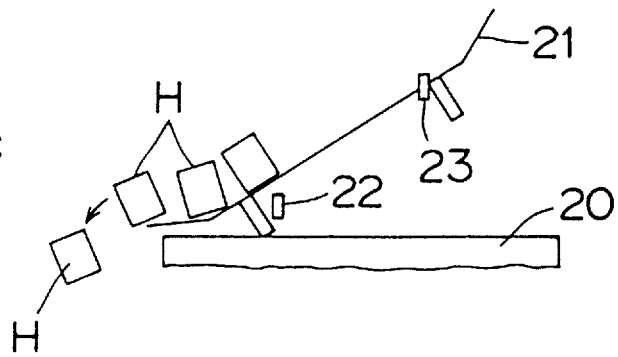
F I G. 6 C
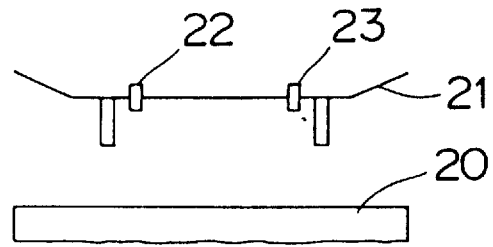
F I G. 6 D F I G. 9
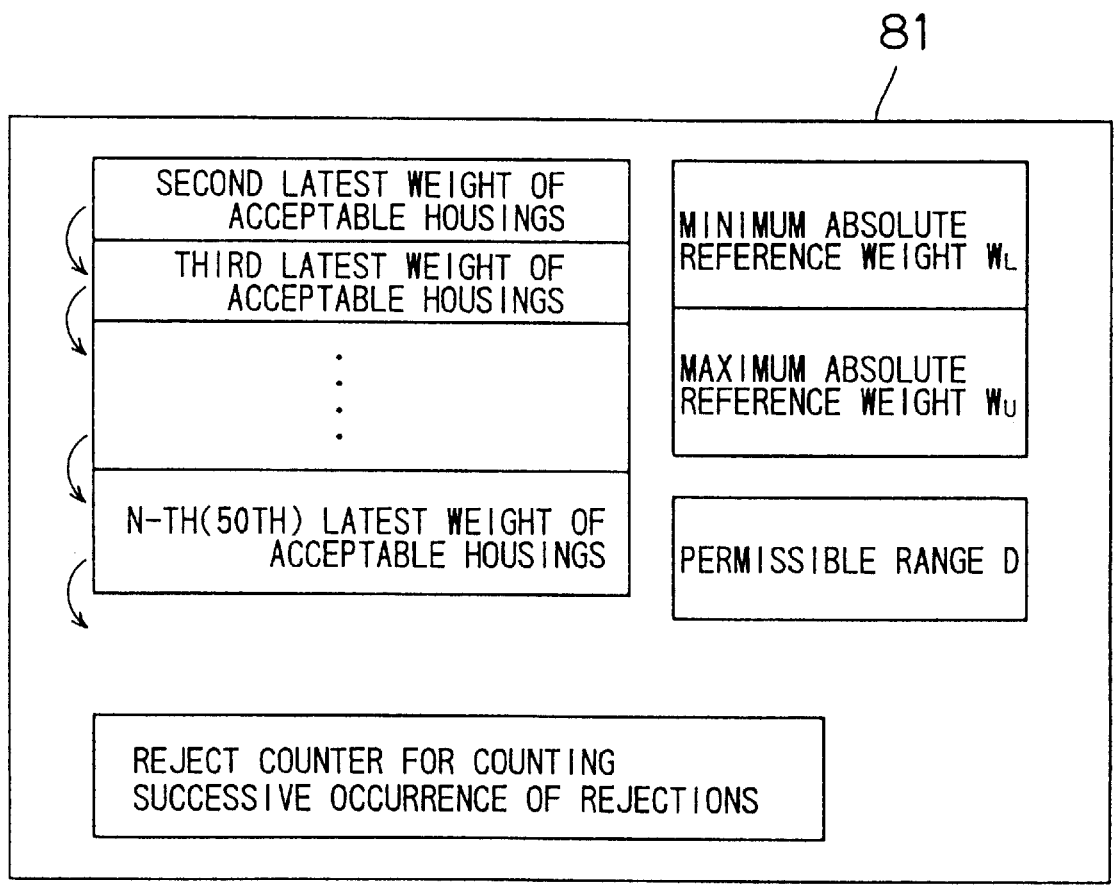

F I G. 12
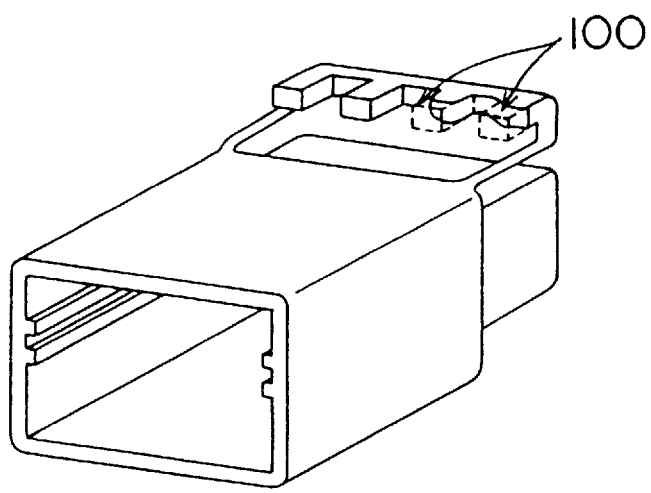

WEIGHT CHECKER FOR MOLDINGS

BACKGROUND OF THE INVENTION

1. Field of the Invention

The present invention relates to weight checkers for measuring the weight of an injection-molded article and judging the acceptability of the molded article based on the measurement result and, more particularly, to weight checkers suitable for checking a molded article having a relatively light weight of several grams to several hundreds grams. Further more particularly, the invention relates to weight checkers suitable for judging the acceptability of a molded resin article such as a connector housing for a wire harness.

2. Description of Related Arts

A resin article molded by means of an injection molding machine sometimes suffers from so-called "short shot" or insufficient injection of resin material. The short shot occurs when the molten resin material does not distribute throughout a mold due to an inappropriate temperature or pressure condition, or when a vent hole for venting air from the mold is clogged during the molding process. The short shot results in rejective resin articles having deficiencies. Such rejective resin articles may range from those acceptable as almost perfect products having negligible deficiencies to those having serious deficiencies.

With the current technology level and construction of the injection molding machine, it is difficult to overcome the short shot problem to perfectly eliminate rejective resin articles. Even with a superior injection molding machine, the short shot occurs once in several thousands to several tens of thousands times of molding operations.

Where articles having a small and complicated configuration such as wire harness connector housing are to be molded, a mold to be employed has a complicated configuration and a large number of small core pins and the like. During repeated molding operations, a small pin of the mold may be broken and taken into a molded connector housing. If the breakage of the pin occurs, articles thereafter molded are all rejective.

For such reason, it has been a conventional practice to check molded resin articles for acceptability. In the molding process of wire harness connector housings, for example, each molded connector housing is visually inspected by human eyes to judge if the housing is acceptable.

However, the visual inspection by human eyes sometimes fails to detect rejective molded articles, making it difficult to ensure a reliable acceptability check. In particular, the rejection ratio of molded articles due to the short shot is once in several thousands to several tens of thousands times of molding operations as described above. This means that most of the molded articles are acceptable and very few are rejective. Therefore, it is almost impossible for an inspector to detect all the few rejective molded articles without failure.

Further, a lot of inspectors are required for a smooth acceptability check of articles successively molded. Where the reject is not attributed to the short shot but to pin breakage in a mold, a great number of rejective molded articles may be produced unless the acceptability check of the molded articles is performed immediately after the molding operation.

In general, the frequency of occurrence of rejections is very low. Therefore, sampling inspection (a checking method in which some of the molded articles are sampled and checked) cannot assuredly detect rejective molded articles.

Thus, there has been no satisfactory art for acceptability check of molded articles.

SUMMARY OF THE INVENTION

In view of the foregoing background of the invention, it is an object of the present invention to provide an apparatus for checking by mechanical means in a short time whether a molded article is acceptable or rejective.

It is another object of the present invention to provide an apparatus for measuring the weight of a plurality of articles molded at one time by means of a pair of molds and checking whether there is a possibility of the presence of any reject in the molded articles.

It is still another object of the present invention to provide an apparatus for, if there is a possibility of the presence of any reject in a group of plural articles molded at one time, discriminating and taking out the group of plural articles possibly including the reject from other molded articles.

It is yet another object of the present invention to provide a method for checking in a short time whether a molded article is acceptable or rejective.

The technical advancement for the achievement of the present invention will first be described.

The present inventors have come up with an idea that the acceptability check of molded resin articles could be performed by weighing the molded articles. A wire harness connector housing judged to be rejective in the acceptability check, for example, may have a small deficiency caused due to a short shot as shown by a reference numeral 100 in FIG. 12. To assuredly detect a reject having such a small deficiency, a high precision weight meter is required. If the weight of the housing is 10 g, for example, a weight meter capable of weighing to a precision of about 0.01 g to 0.001 g is required. Such high precision weighing can be achieved by means of an electronic balance.

In general, a molded resin article is hygroscopic and, therefore, the weight thereof slightly increases over time after a molding process. To accurately determine the weight of the molded resin article, the weight measurement should be carried out immediately after the molding process. More specifically, it is desired to provide a weight measuring process for weighing the molded article immediately downstream of the molding process performed by an injection molding machine.

However, the high precision electronic balance is susceptible to vibration and shock, and easily affected by wind. Therefore, it is difficult to accurately measure the weight of a molded article only by providing the electronic balance immediately downstream of the molding process line, and additional considerations are required.

As will be described later, articles molded in repeated injection molding operations have different weights even if the molded articles are acceptable. An actual weight measurement showed that the weight of a molded article fluctuated in a certain cycle. This means that the acceptability check of the molded article cannot be accurately performed by simply comparing a measurement value with a certain fixed reference value. The present inventors have achieved the present invention, which allows for an accurate acceptability check by judging on the basis of a newly proposed reference value (which will be described later) whether the molded article is acceptable or possibly rejective.

In accordance with the present invention, the weight of an article molded in a single injection molding operation is measured by means of a weight meter such as an electronic balance, and then compared with a predetermined reference weight. If the difference between the measured weight and the predetermined reference weight is within a predetermined permissible range, it is judged that the molded article is acceptable. On the other hand, if the difference is out of the permissible range, it is judged that the molded article is possibly rejective. Therefore, the injection-molded article can be efficiently checked for acceptability based on the weight thereof by mechanical means.

Thus, the present invention makes it possible to automatically check by the mechanical means whether the injection-molded article is acceptable or possibly rejective, thereby saving a labor required for a visual inspection process which is performed by a lot of inspectors. If it is judged that the molded article is possibly rejective, only this particular molded article is visually inspected by an inspector. Since the inspector visually inspects only a small number of molded articles judged to be rejective, the labor required for the acceptability check can be reduced.

Where a plurality of articles having the same configuration are injection-molded at one time, the plurality of molded articles may be checked for acceptability at one time. Exemplary molds to be employed for injection molding include four-cavity mold, six-cavity mold and eight-cavity mold, which are adapted to mold a plurality of articles having the same configuration at one time. Even though the plurality of articles molded with such a mold have the same configuration, the weights of the respective molded articles are slightly different from each other when individually measured. However, the variation in the weight can be accommodated by measuring the total weight of the plurality of articles molded at one time and checking the acceptability of the articles as a whole on the basis of the total weight. Moreover, the acceptability check of plural molded articles can be rapidly performed.

In this case, it may be judged that one or more of the plurality of weighed articles are possibly rejective, if the difference between the total weight of the molded articles and the reference weight exceeds a predetermined permissible value.

The weight check may be carried out in conjunction with the injection molding operation. More specifically, the weight of articles molded in a single injection molding operation may be measured before articles are molded in the next injection molding operation, and then the acceptability of the molded articles is checked on the basis of the measured weight.

Thus, the weight check is performed in conjunction with the injection molding operation, i.e., immediately after the injection molding. The weight check performed just after the molding allows for an accurate acceptability check, even if the molded resin articles are hygroscopic.

The molded articles may be classified based on the result of the acceptability check. In this case, an inspector may check for acceptability only a relatively small number of molded articles classified into a possibly rejective article group. This significantly lessens the labor of the inspector, and yet allows the inspector to assuredly detect a reject.

The reference weight may be stored in storage means. In this case, the reference weight stored in the storage means may be updated. The update of the reference weight may be made, for example, every time an acceptance judgment is made, so that the latest reference weight can be referred to at any time. In this case, a new reference weight is preferably determined by averaging up the weights of a plurality of molded articles judged to be acceptable. For example, the reference weight may be determined by averaging up the weights of molded articles judged to be acceptable in the past fifty acceptability checks. Although the weight of a molded article fluctuates during repeated molding operations, the reference weight thus determined accommodates the variation in the weight because the average weight also fluctuates. Therefore, an accurate acceptability check of molded articles can be realized.

The storage means may be adapted to store a plurality of weight data of articles molded in past molding operations, rather than the aforesaid reference weight. In this case, the plurality of weight data stored in the storage means may be averaged as required, and the average weight may be employed as a reference weight. This facilitates the update of the reference weight.

Where a plurality of storage areas of the storage means are all occupied by the weight data of molded articles written therein, weight data written earliest may be replaced with weight data of a molded article lastly judged to be acceptable. Thus, the stored weight data which provide the basis of the calculation of the reference weight are constantly updated and, hence, the reference weight is also constantly updated into the latest value.

Below a mold for molding an article may be provided transportation means for transporting the molded article dropping out of the mold to weight measuring means. The molded articles taken out of the mold can successively be transported to the weight measuring means in conjunction with the operations of the mold and the injection molding line.

The acceptability check may be performed by comparing the weight of a molded article with a predetermined absolute reference value. In this case, it is judged that the molded article is possibly rejective, when the difference is not less than a predetermined value. Thus, the possibility of the rejection can be more strictly checked.

Above the weight measuring means may be provided a tray for placing thereon injection-molded articles. When the molded articles are loaded on the tray, the tray is first supported in an initial position spaced apart from a scale face of the weight measuring means, and then loaded onto the scale face. Since the tray is spaced apart from the scale face when the molded articles to be weighed are loaded thereon, the scale face is not subjected to a shock or the like. In particular, where the weight measuring means is a high precision electronic balance or the like, a shock to the scale face is unwelcome. By employing the tray, the molded articles can be loaded onto the scale face without giving a shock to the scale face.

The tray may be adapted to be tilted in a first direction or in a second direction in accordance with the result of the acceptability check of a molded article, and then returned to the initial position. Thus, the molded article can be classified in accordance with the result of the acceptability check in which it is judged on the basis of the measured weight whether the molded article is acceptable or rejective. The weight measuring process and acceptability checking process based on the measurement result can be performed while the tray is serially transported.

At least the tray and the weight measuring means may be surrounded with a windshield formed with two windows for passing therethrough a molded resin article slipping down from the tray. The windows may be each provided with a shutter which is adapted to open in conjunction with the tilt of the tray. With this arrangement, the windshield protects the weight measuring means from wind. Therefore, the high precision weight measuring means can accurately perform weight measurement without being influenced by wind.

After the weight measurement, the molded article is taken out through either one of the windows opened by raising the shutters with no problem.

Further, transportation means for transporting the injection-molded article to the aforesaid tray may be provided. The tray may be transported in conjunction with the injection molding cycle. Thus, the weights of molded articles can be successively measured in conjunction with the injection molding cycle for acceptability check of the molded articles. The weight measurement of the molded articles can be carried out immediately after the molding operation, thereby ensuring an accurate acceptability check.

These and other objects, features and functions of the present invention will be apparent from the following detailed description of a preferred embodiment with reference to the attached drawings.

BRIEF DESCRIPTION OF THE DRAWINGS

FIG. 4 is a front view illustrating the construction of the weight checker.

FIG. 5 is a perspective view illustrating an arm driving mechanism for moving a tray.

FIGS. 6A, 6B, 6C and 6D are diagrammatical representations illustrating the states of the tray moved by arms.

FIG. 9 is a diagram illustrating data stored in a memory 81.

FIG. 12 is a perspective view illustrating a typical rejective housing.

DESCRIPTION OF THE PREFERRED EMBODIMENT

Figure 1:
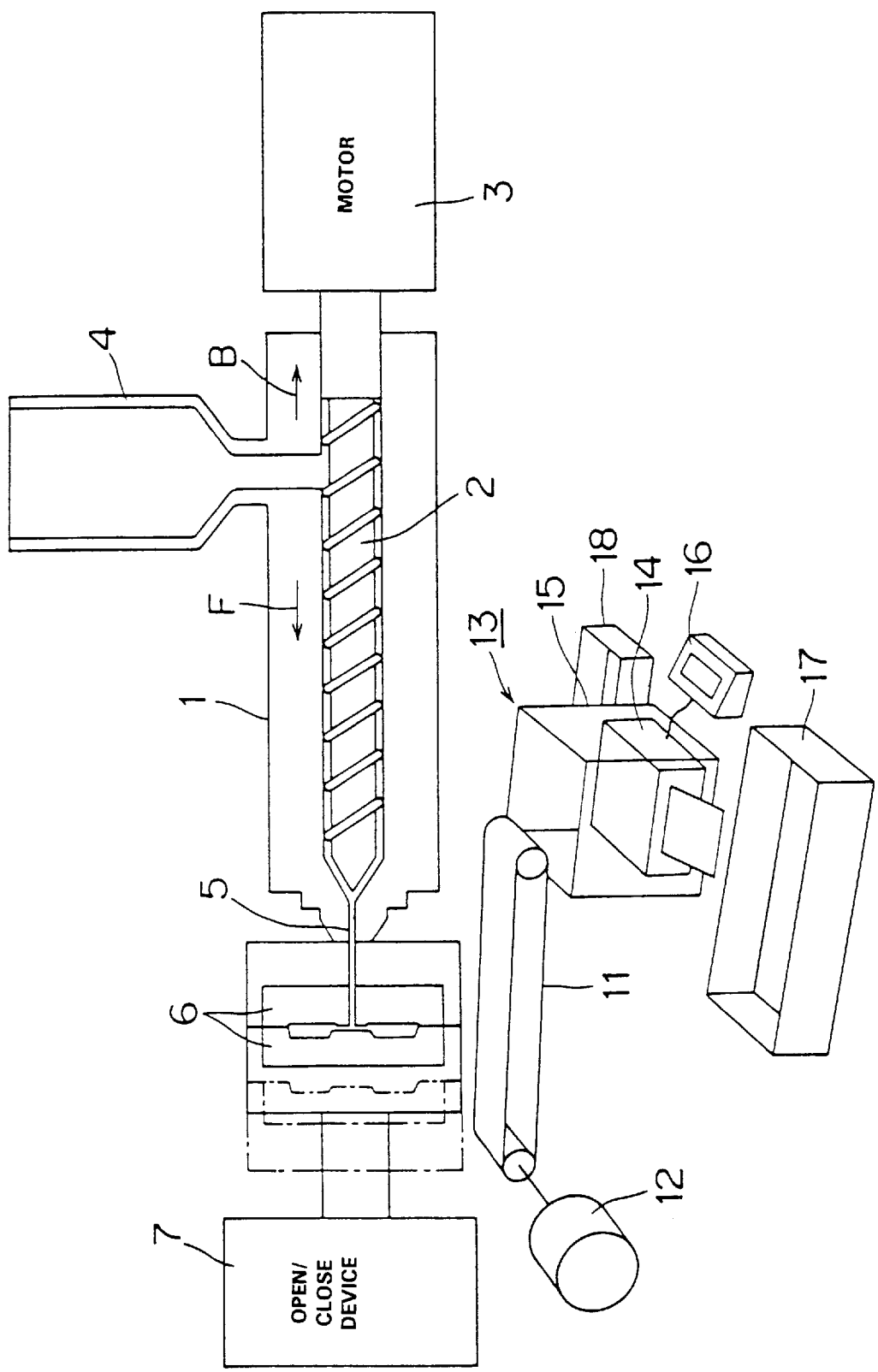
FIG. 1 is a diagrammatical representation illustrating a construction of a weight checker in accordance with one embodiment of the present invention along with a construction of an injection molding machine.

FIG. 1 is a diagrammatical representation illustrating a construction of a weight checker in accordance with one embodiment of the present invention along with a construction of an injection molding machine.

Referring to FIG. 1, the injection molding machine has a heat cylinder 1 and a screw 2 inserted therein. The screw 2 is adapted to be traveled in a forward direction F and in a backward direction B, for example, by an oil motor 3 coupled with the rear end of the screw 2. A hopper 4 is provided in an upper rear position of the heat cylinder 1. Resin material (not shown) charged in the hopper 4 is supplied to the heat cylinder 1.

When the screw 2 is rotatively traveled in the rear direction B, the resin material supplied from the hopper 4 is transported forward by means of the screw 2, and melted and charged into a front portion of the heat cylinder 1. At this time, the rearward travel distance of the screw 2 determines the amount of the molten resin to be charged into the cylinder 1, which is to be utilized for one injection molding operation.

When the screw 2 is slid in the forward direction F, the molten resin charged in the heat cylinder 1 is injected into a mold 6 from an injection nozzle 5 provided at the front end of the heat cylinder 1. The molten resin charged into the mold 6 is allowed to stand under a predetermined pressure for a predetermined time period for curing. That is, the pressure of the molten resin in the mold 6 is maintained at the predetermined level by means of the screw 2. After the resin is cured in the mold 6, the mold 6 is opened by means of an open/close device 7, and the molded resin articles are taken out. Thereafter, the mold 6 is closed again by means of the open/close device 7 for the next molding operation.

The resin molding process sequence includes the aforesaid injection molding process, pressure maintaining process and mold open/close process.

The weight checker in accordance with this embodiment is adapted to measure the weight of the molded articles in conjunction with the aforesaid resin molding process sequence and judge whether the molded articles are acceptable or possibly rejective. A belt conveyor 11 is provided below the mold 6 in this embodiment. The belt conveyor 11 is driven by a motor 12 constantly or as required. When the mold 6 is opened, the articles molded in the mold 6 drop out of the mold 6. The molded articles thus taken out are received by the belt conveyor 11 and transported to the weight checker 13. The weight checker 13 includes an electronic balance 14, a windshield 15 for protecting the electronic balance 14 from wind, and a display device 16, all of which will be detailed later. The weight checker 13 judges on the basis of the weight of the molded articles whether the molded articles are acceptable or possibly rejective. The acceptable articles are sent to an acceptance box 17 and the rejective articles are sent to a rejection box 18.

Figure 2A:
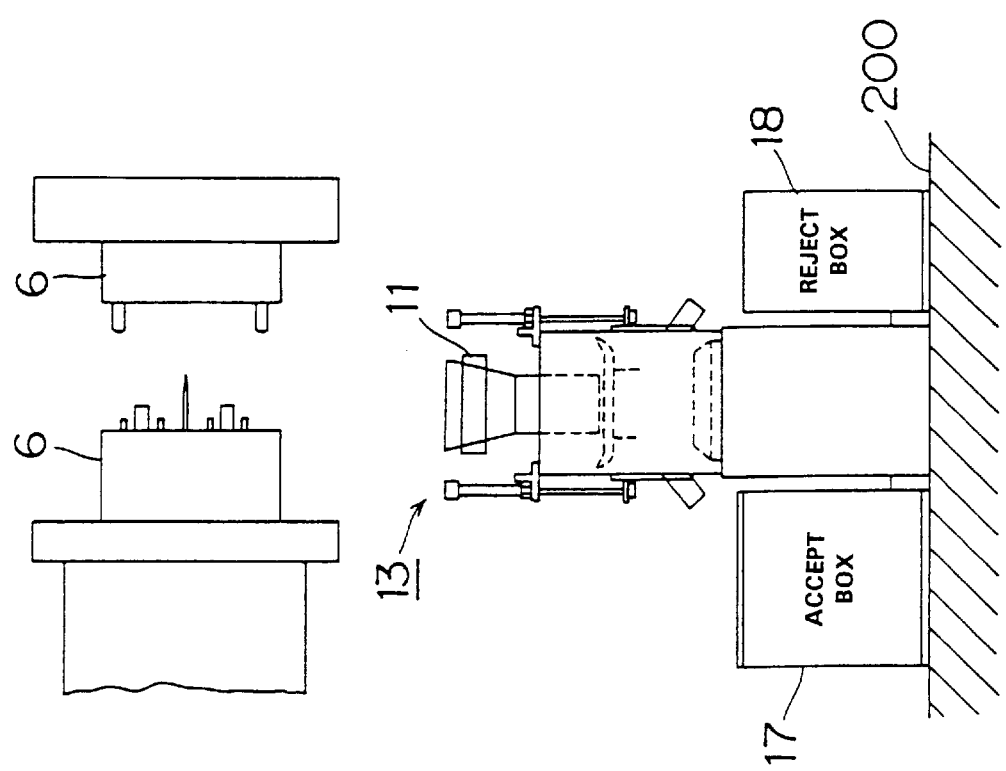
FIGS. 2A and 2B are diagrams illustrating the positional relationship between a mold and the weight checker.
Figure 2B:
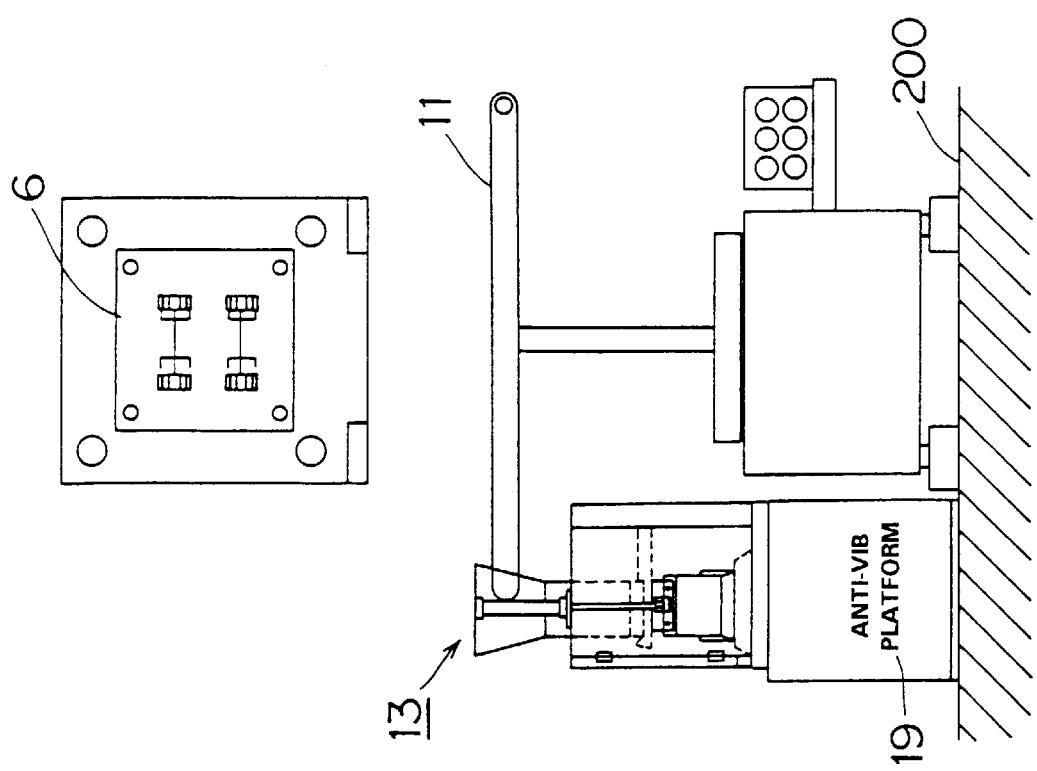

FIGS. 2A and 2B are diagrams illustrating the positional relationship between the mold 6 of the injection molding machine shown in FIG. 1 and the weight checker 13. More specifically, FIG. 2A illustrates the positional relationship between the mold 6 and the weight checker 13 as viewed in the direction indicated by arrow F, and FIG. 2B illustrates the positional relationship between the mold 6 and the weight checker 13 as viewed from the left of FIG. 2A.

Referring to FIGS. 2A and 2B, the mold 6 is a so-called four-cavity mold in this embodiment. That is, four molded articles having the same configuration are obtained in one molding operation. In the following explanation, articles to be molded are connector housings. When the mold 6 is opened as shown in FIG. 2B, four housings (not shown) drop out of the mold 6. The belt conveyor 11 is horizontally disposed below the mold 6 and extends in a direction perpendicular to a mold open/close direction. The housings dropping out of the mold 6 are received by the belt conveyor 11. When the belt conveyor 11 is driven, the housings are transported to the weight checker 13 located on the forward side of the mold 6.

The weight checker 13 is disposed, for example, on a platform 19 which is adapted to prevent vibration or the like from being conducted to the weight checker 13 from a floor 200. On the opposite sides of the weight checker 13 are disposed the acceptance box 17 and rejection box 18. The housings subjected to the weight check are delivered into either the acceptance box 17 or the rejection box 18.

Figure 3:
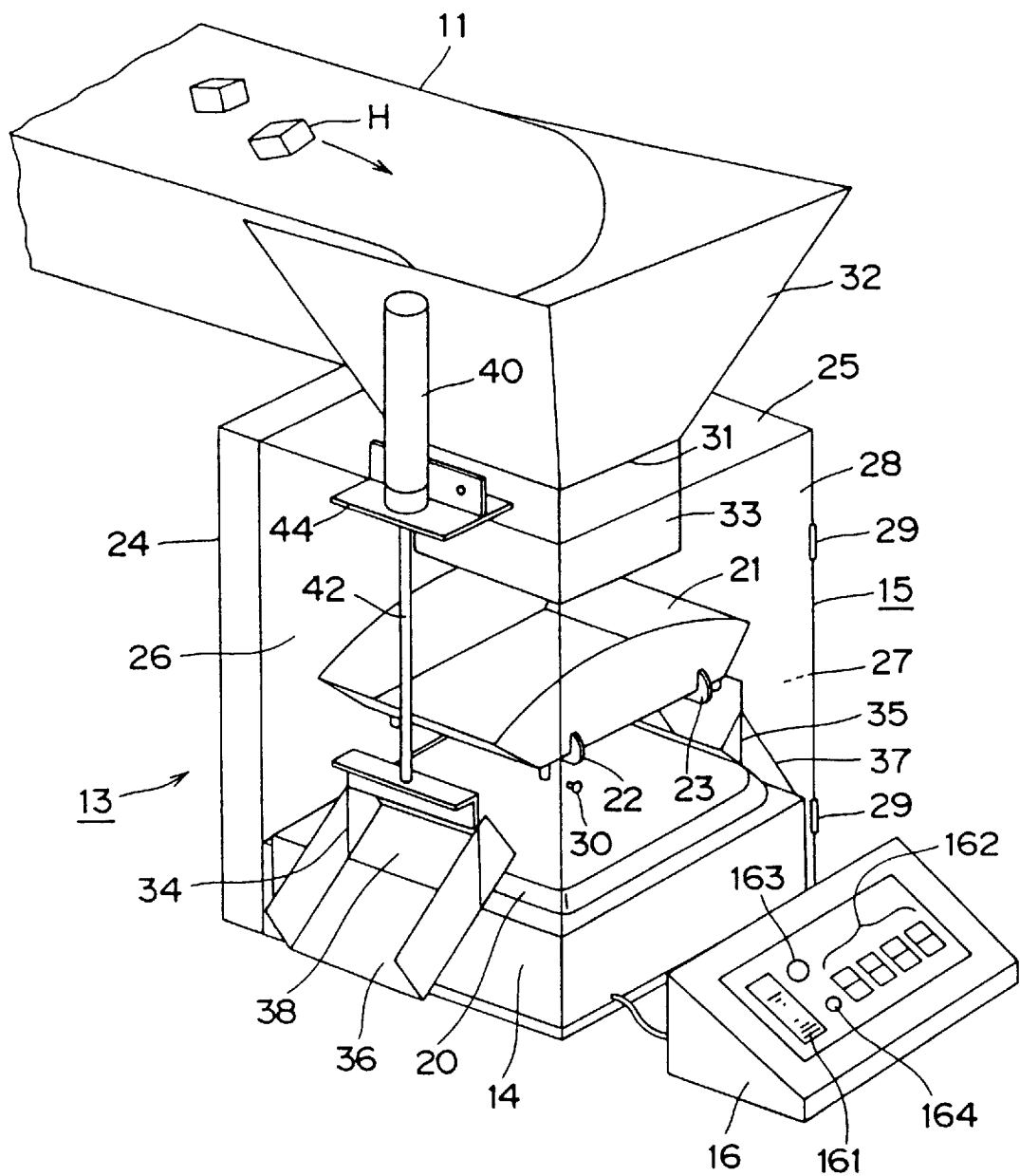
FIG. 3 is a perspective view illustrating the construction of the weight checker.

FIGS. 3 and 4 are a perspective view and a front view, respectively, illustrating the construction of the weight checker.

Referring to FIGS. 3 and 4, the weight checker 13 has the electronic balance 14 as previously stated. The electronic balance 14 is, for example, a high precision electronic balance of electromagnetic equilibrium type having a scale plate 20 on which objects (connector housings) H to be weighed are placed, and may have a maximum weighing capability of 410 g and a minimum display capability of 0.001 g. Dropping the housings H onto the scale plate 20 of the high precision electronic balance 14 may cause a failure. To avoid such a failure, this embodiment employs a tray 21, which is provided above the scale plate 20. The tray 21 is supported by a pair of arms 22 and 23. When the housings H to be weighed are placed on the tray 21, the arms 22 and 23 are located in an upper position so that the tray 21 is upwardly spaced apart from the scale plate 20. In this state, the housings H to be weighed are dropped onto the tray 21. When the housings H are to be measured, the arms 22 and 23 are slowly lowered, and the tray 21 on which the housings H are placed is mounted on the scale plate 20. The tray 21 has legs 21a in four corners of the under surface thereof and, therefore, the four legs contact the upper surface of the scale plate 20. At this time, the arms 22 and 23 are located in a position spaced apart from the tray 21 within a clearance which is defined by these four legs 21a between the under surface of the tray 21 and the upper surface of the scale plate 20.

An accommodation box 24 is upstandingly disposed on the rear side of the electronic balance 14. The accommodation box 24 is connected at the lower portion thereof to the rear face of the electronic balance 14 and extends along the rear face of the electronic balance 14 to cover the rear face of the electronic balance 14. Provided within the accommodation box 24 is a driving mechanism (see FIG. 5) coupled to the rear ends of the arms 22 and 23 for moving up and down the arms 22 and 23. The driving mechanism will be detailed later.

The periphery (front face, right and left side faces and top face) of the electronic balance 14 and the tray 21 is surrounded with a windshield 15. The windshield 15 is connected to the accommodation box 24, and the accommodation box 24 and the windshield 15 cooperatively surround the periphery of the electronic balance 14 and tray 21.

The electronic balance 14 is highly precise. Therefore, without the windshield, the scale plate 20 is finely vibrated by wind, particularly, by crosswind, making it difficult to obtain a stable measurement. This is why the electronic balance 14 and its peripheral mechanism are covered with the windshield 15. The windshield 15 includes a top plate 25, a left side plate 26, a right side plate 27 and a front plate 28 which are formed, for example, of a transparent or semitransparent acrylic plate for inside check. These plates may, of course, be formed of an opaque material. The top plate 15 and the left and right side plates 26 and 27 are connected to each other as well as connected to the accommodation box 24. On the other hand, the front plate 28 is adapted to be openable. More specifically, the right side of the front plate 28 is hinged to the front side of the right side plate 27 with a pair of hinges 29. A handle 30 to be grasped when the front plate 28 is opened or closed is provided on a central portion of the left side of the front plate 28.

The top plate 25 has an opening 31 formed in the central region thereof. A reception chute 32 upwardly flared from the top plate 25 is connected to the opening 31. The belt conveyor 11 is arranged so that the housings H are conveyed to the reception chute 32. Below the opening 31 of the top plate 25 is provided a guide chute 33 having, for example, a parallelogramic cross section and extending into the inside of the windshield 15. The guide chute 33 introduces onto the tray 21 the housings H put into the reception chute 32. That is, the guide chute 33 guides the housings H onto the tray 21 so as to prevent the housings H received by the reception chute 32 and introduced from the opening 31 from dropping out of the tray 21.

The peripheral portion of the tray 21 is upwardly bent, i.e., formed into a boat shape having a flat bottom, so that the housings H dropping through the guide chute 33 are assuredly received by the tray 21.

When the tray on which the housings H are placed is mounted on the scale plate 20, the weight of the tray 21 containing the housings H is measured. Then, the weight of the housings H calculated by subtracting the weight of the tray 21 from the measurement is displayed on the display device 16 as a measurement result. The display device 16 includes a stability indication bar 161, four numerical segment displays 162 for weight display, an acceptance lamp 163 and a rejection lamp 164. The stability indication bar 161 indicates that the scale plate 20 has been stabilized. After the scale plate 20 is stabilized, the weight is displayed on the numerical segment displays 162. As previously stated, the weight of the housings H is calculated by subtracting the weight of the tray 21 from the measurement. Of course, the measured weight including the weight of the tray 21 may otherwise be employed as the measurement result. The measurement result to be displayed can be easily changed by changing a calculation method. If the weight of the housings H is within a predetermined range with respect to a reference weight which will be described later, the acceptance lamp 163 is lit. If the weight is out of the range, the rejection lamp 164 is lit.

Windows 34 and 35 are formed in lower portions of the left and right side plates 26 and 27, respectively. Sliding ways 36 and 37 are attached to the windows 34 and 35, respectively. The sliding ways 36 and 37 extend downwardly and outwardly from the inside space of the windshield 15 through the windows 34 and 35 to guide the housings H sliding out of the tray 21 to either the acceptance box 17 or the rejection box 18 as will be described later (see FIG. 2). Shutters 38 and 39 are engaged with the windows 34 and 35, respectively. The shutters 38 and 39 are respectively attached to the tips of rods 42 and 43 of left and right shutter cylinders 40 and 41. The left and right shutter cylinders 40 and 41 are respectively fixed to the top plate 25 by mounting plates 44 and 45. When the left and right shutter cylinders 40 and 41 are activated, the rods 42 and 43 are retracted into the left and right shutter cylinders 40 and 41, and the shutters 38 and 39 attached at the tips of the rods 42 and 43 are upwardly slid. Thus, the windows 34 and 35 are opened. On the contrary, when the left and right shutter cylinders 40 and 41 are deactivated, the rods 42 and 43 are extended and the shutters 38 and 39 come down to close the windows 34 and 35. Since the windows 34 and 35 can be opened only at a required time, crosswind is prevented from coming into the inside of the windshield 15 through the windows 34 and 35. The timing of the activation and deactivation of the left and right shutter cylinders 40 and 41 or the timing of the opening and closing of the windows 34 and 35 will be described later.

FIG. 5 is a perspective view illustrating a driving mechanism for driving the arms 22 and 23. Referring to FIG. 5, the rear ends of the arms 22 and 23 are fixed to the lower ends of vertical linkage plates 46 and 47 extending vertically. Horizontal linkage plates 48 and 49 are connected to the upper ends of the vertical linkage plates 46 and 47. The horizontal linkage plates 48 and 49 are also connected to the tips of the rods 52 and 53 of left and right tray cylinders 50 and 51. The left and right tray cylinders 50 and 51 are arranged so that the rods 52 and 53 are vertically retractable. Return springs 54 and 55 are fitted around the rods 52 and 53. The left and right tray cylinders 50 and 51 are fixed to a frame or the like within the accommodation box 24 (see FIG. 3). When the left tray cylinder 50 is activated, the rod 52 is retracted into the left tray cylinder 50, thereby lowering the arm 22. When the left tray cylinder 50 is deactivated, the rod 52 is extended by the force of the return spring 54, thereby lifting the arm 22. Likewise, when the right tray cylinder 51 is activated, the rod 53 is retracted into the right tray cylinder 51, thereby lowering the arm 23. When the right tray cylinder 51 is deactivated, the rod 53 is extended, thereby lifting the arm 23.

If the left and right tray cylinders 50 and 51 are simultaneously activated, the arms 22 and 23 are simultaneously lowered, thereby lowering the tray 21. On the other hand, if either the left tray cylinder 50 or the right tray cylinder 51 is activated, the corresponding arm 22 or 23 is located in a lower position, and the other arm 23 or 22 is located in an upper position. Thus, the tray 21 is tilted.

FIGS. 6A to 6D are diagrammatical representations illustrating the states of the arms 22 and 23, the tray 21, and the housings H.

When the housings H are to be placed on the tray 21, the arms 22 and 23 are both lifted to space the tray 21 apart from the scale plate 20, as shown in FIG. 6A. Therefore, the scale plate 20 is not subjected to a shock when the housings H are dropped on the tray 21.

When the weight of the housings H are to be measured, the arms 22 and 23 are simultaneously lowered so that the legs 21a of the tray 21 abut against the scale plate 21, as shown in FIG. 6B. Then, the arms 22 and 23 are further lowered to be located between the tray 21 and the scale plate 20 so that the arms 22 and 23 contact neither the tray 21 nor the scale plate 20. In this state, the weight measurement is carried out.

As the result of the weight measurement, if the measurement value is within a predetermined range with respect to the predetermined reference value, it is judged that the housings H are acceptable. Then, only the arm 23, for example, is lifted as shown in FIG. 6C, thereby tilting the tray 21. Thus, the housings H placed on the tray 21 slide down to the left, and drop from the tray 21. The dropping housings H slide down on the slide way 36 (see FIGS. 3 and 4) to drop into the acceptance box 17 (see FIG. 2). At this time, the shutter 38 is, of course, raised to open the window 34.

This state is maintained for a predetermined time period required for the four housings H to completely slide out of the tray 21, and then the arm 22 is lifted (see FIG. 6D). Then, the tray 21 returns to the initial position where housings are received.

When the housings H are judged to be rejective, only the arm 22 is lifted from the position shown in FIG. 6B, thereby tilting the tray to the right. Thus, the housings H slide down into the rejection box 18 (see FIG. 2).

Figure 7:
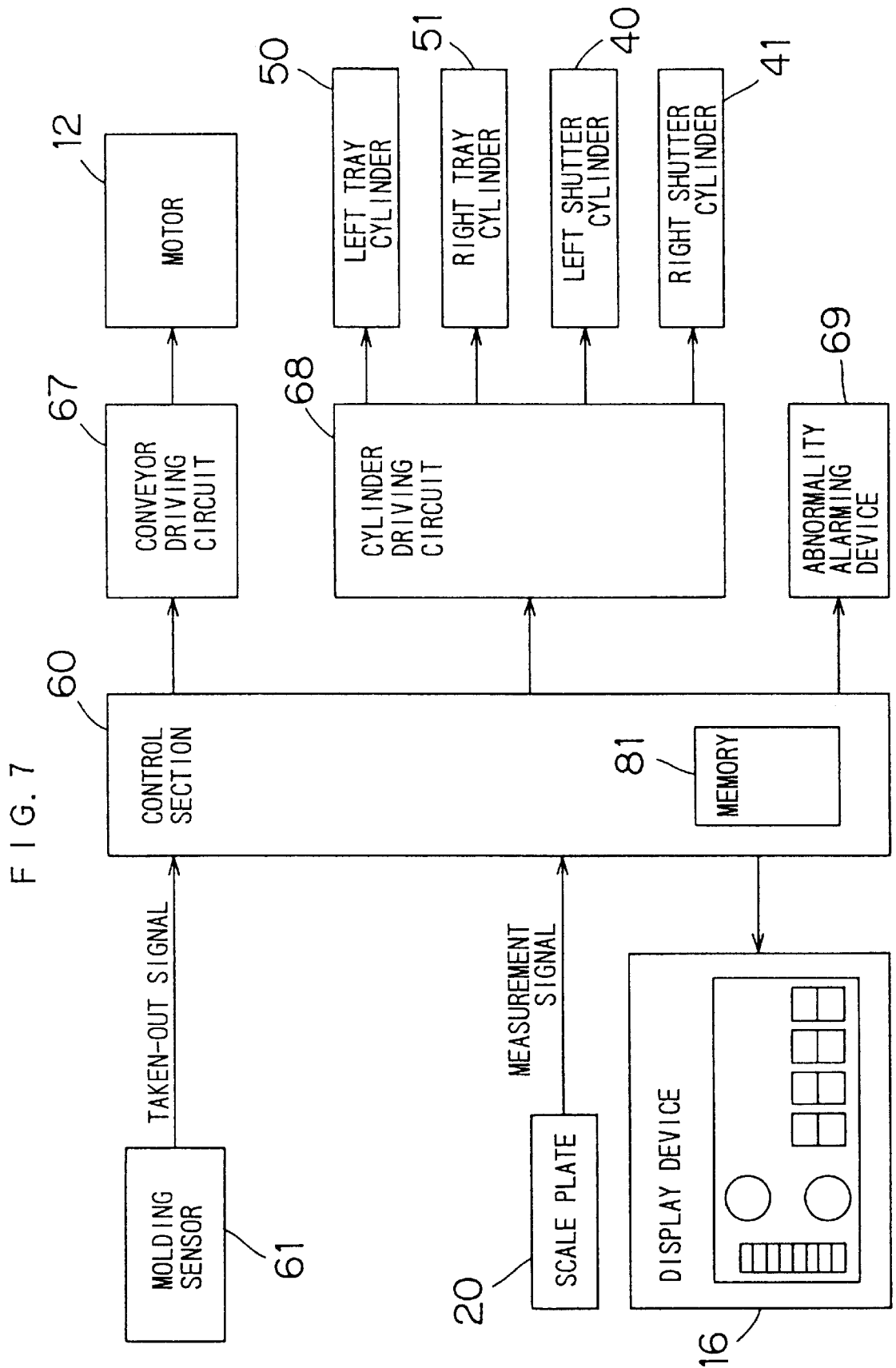
FIG. 7 is a block diagram illustrating an electrical construction of the weight checker.

FIG. 7 is a block diagram illustrating a construction of an electrical control portion for controlling the driving of the weight checker 13 in accordance with this embodiment. The weight checker 13 has a control section 60 employing, for example, a microprocessor and the like. A taken-out signal is applied to the control section 60 from a molding sensor 61 provided in the injection molding machine. The molding sensor 61 outputs the taken-out signal, for example, when the mold 6 is opened or, alternatively, when the injection process by the injection molding machine is completed. That is, it is sufficient that the molding sensor 61 is adapted to output the taken-out signal in response to the completion of the injection molding process.

The control section 60 controls a conveyor driving circuit 67 and a cylinder driving circuit 68 based on the signal from the sensor 61. More specifically, the control section 60 applies a signal to the conveyor driving circuit 67 in response to the reception of the taken-out signal applied from the molding sensor 61 to allow the conveyor driving circuit 67 to rotate the motor 12. The belt conveyor 11 is driven by the rotation of the motor 12. The control section 60 applies a signal to the cylinder driving circuit 68 to control the activation and deactivation of the left and right tray cylinders 50 and 51 for respectively moving up and down the arms 22 and 23, and the activation and deactivation of the left and right shutter cylinders 40 and 41 for respectively moving up and down the shutters 38 and 39.

The control section 60 calculates the weight of the housings H placed on the scale plate 20 based on a measurement signal applied thereto from the scale plate 20, and compares the calculated value with the reference weight stored in a memory 81. Then, the control section 60 judges on the basis of the comparison result whether the housings H are acceptable or possibly rejective. The calculated weight and the judgment result are applied to the display device 16 and displayed thereon. If the control section 60 successively judges from calculated weights, for example, more than five times that housings H are rejective, the aforesaid pin breakage has possibly occurred. To cope with such an event, the control section 60 is preferably adapted to apply a signal to an abnormality alarming device 69 to prompt an operator to check the mold 6.

Figure 8:
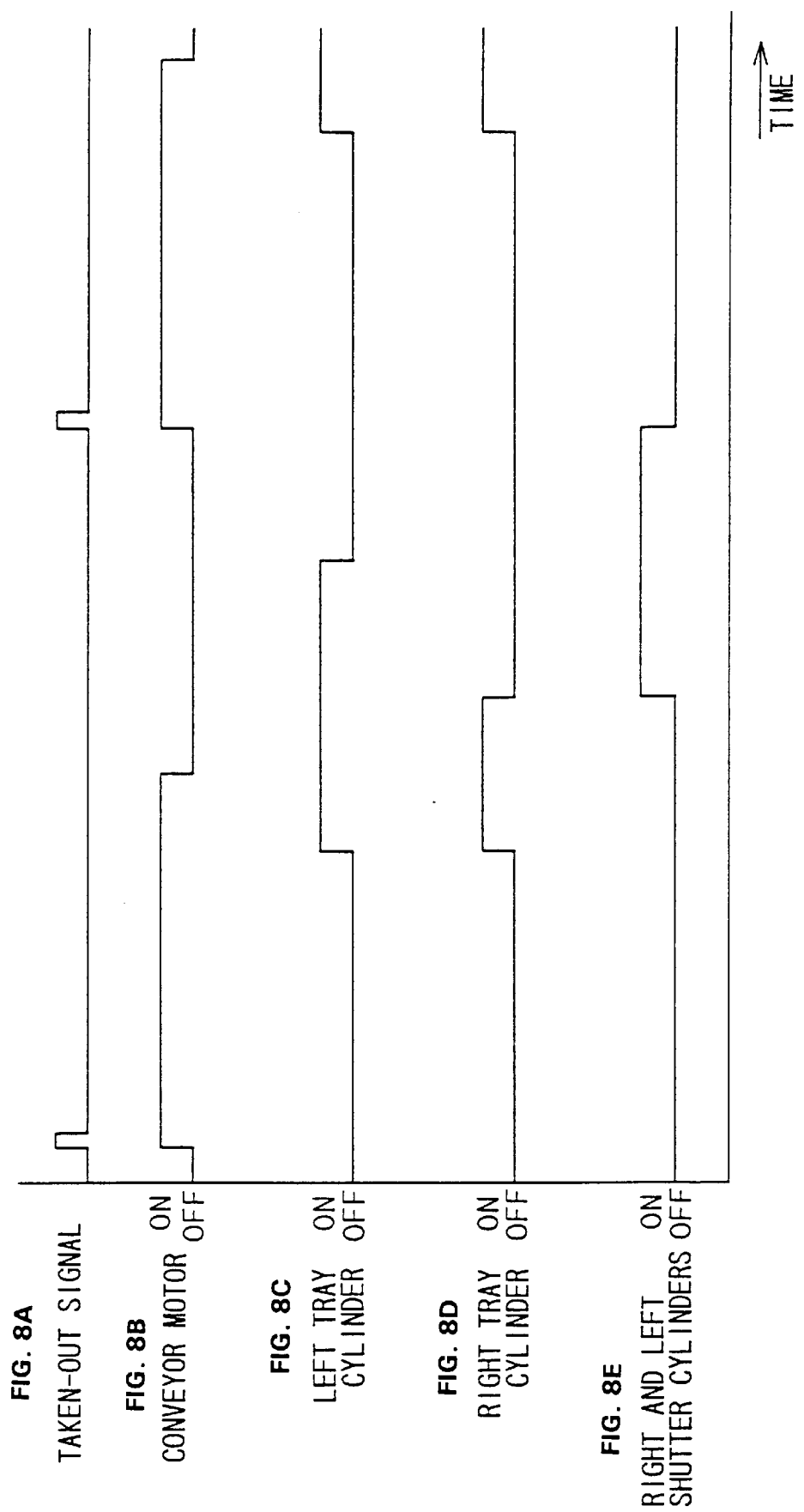
FIG. 8 is a timing chart for explaining the operation of the weight checker having the electrical construction shown in FIG. 7.

FIG. 8 is a timing chart for explaining the operation of the electrical control portion shown in FIG. 7. Mainly referring to FIGS. 3 and 7, the operation of the weight checker 13 will be explained in accordance with the timing chart shown in FIG. 8.

First, a taken-out signal is applied from the molding sensor 61. As shown in FIG. 8, the taken-out signal is a pulse signal which is output, for example, when the mold 6 is opened (see FIG. 2B) by means of the open/close device 7. In response to the taken-out signal, the control section 60 applies an ON signal to the conveyor driving circuit 67. In response thereto, the motor 12 is rotated by the conveyor driving circuit 67 to drive the belt conveyor 11. The driving of the belt conveyor 11 is stopped after a predetermined time period. In this embodiment, the belt conveyor 11 is driven only when necessary to transport the housings H dropped onto the belt conveyor 11 to the weight checker 13.

Where the resin molding cycle is short, however, it is not preferable to frequently turn on and off the belt conveyor 11 and, therefore, the belt conveyor 11 may be constantly driven.

The control section 60 starts a timing operation in response to the reception of the taken-out signal applied from the molding sensor 61. After a predetermined time period has elapsed since the rising of the taken-out signal, the control section 60 applies a signal to the cylinder driving circuit 68 to activate the left and right tray cylinders 50 and 51. The predetermined time period is a time period necessary and sufficient for the housings H to be taken out of the opened mold 6 onto the belt conveyor 11, then transported to the weight checker 13 by the belt conveyor 11 and dropped onto the tray 21.

In this embodiment, the mold 6 is a so-called four-cavity mold as previously described. Therefore, when the mold 6 is opened, four housings drop onto the belt conveyor 11 at one time. These four housings H are transported to the weight checker 13 and dropped onto the tray 21.

When the left and right tray cylinders 50 and 51 are simultaneously activated, the tray on which the four housings H are placed is lowered from the upper position to the lower position. The control section 60 takes in a measurement signal sent from the scale plate 20 a little after the rising of signals applied to the left and right tray cylinders 50 and 51. Immediately after the tray 21 is mounted on the scale plate 20, the scale plate 20 is finely vibrated and, therefore, the measurement signal is unstable at the beginning. After the fine vibration of the scale plate 20 stops and the measurement signal becomes stable, the control section 60 calculates the weight of the four housings based on the stable measurement signal. The weight of the four housings H is determined by subtracting the weight of the tray 21 from the measured weight indicated by the measurement signal. The weight of the tray 21 may be measured at the time of initialization and the weight may be stored in the memory 81. The stability degree of the measurement signal is indicated by the stability indication bar 161 of the display device 16. When the stability indication bar 161 indicates that the measurement signal has become stable, the total weight of the four housings H is displayed on the numerical segment displays 162.

The control section 60 compares the calculated weight of the housings H with the reference weight which is calculated based on data preliminarily stored in the memory 81. As the result of the comparison, if the calculated weight of the housings H is within the predetermined permissible range with respect to the reference weight, it is judged that the four housings H are all acceptable. On the other hand, if the calculated weight is out of the permissible range, it is judged that at least one of the four housings H is rejective. This judgment result is sent to the display device 16, and either acceptance lamp 163 or the rejection lamp 164 is lit. The judging method and the method of determining the reference weight will be described later.

When an acceptance judgment is made, for example, only the right tray cylinder 51 is deactivated and the left tray cylinder 50 is kept activated. That is, the tray 21 is tilted to the left as described with reference to FIG. 6C.

At the same time, the left and right shutter cylinders 40 and 41 are activated to raise both of the shutters 36 and 37, thereby opening both of the windows 34 and 35. The housings H judged to be acceptable slide down on the slide way 36 through the window 34, and are dropped into the acceptance box 17.

After a time period required for the four housings H to completely slide down from the tray 21 has elapsed, the left tray cylinder 50 is deactivated, whereby the tray 21 returns to the upper position.

On the other hand, where a rejection judgment is made, the left tray cylinder 50 is deactivated and the right tray cylinder 51 is kept activated, so that the tray 21 is tilted to the right. Then the right tray cylinder 51 is deactivated.

A little after that, the left and right shutter cylinders 40 and 41 are deactivated, and the shutters 37 and 38 are lowered, thereby closing the windows 34 and 35.

In this embodiment, the left and right shutter cylinders 40 and 41 are controlled for simultaneous activation and deactivation and, therefore, the windows 34 and 35 are simultaneously opened. Instead of such a control method, where the housings H are to be taken out through the window 34 by tilting the tray 21 to the left, for example, only the left shutter cylinder 40 is activated and the right shutter cylinder 41 is kept deactivated to open only the window 34.

FIG. 9 is a diagram illustrating data stored in the memory 81 shown in FIG. 7. The memory 81 has storage areas for storing therein weight data of N groups (e.g., 50 groups) of housings judged to be acceptable in the past N (e.g., 50) weight checking operations. The weight data of acceptable groups of housings obtained in the past weight checking operations are stored in the respective storage areas. Where it is judged in the latest weight checking operation that a group of housings is acceptable, the weight data thereof is stored in the memory 81. At this time, the weight data written into the memory 81 earliest, i.e., the N-th latest weight data (e.g., 50th latest weight data) of an acceptable group of housings is replaced with the latest weight data of the acceptable group of housings. Alternatively, the N-th latest weight data (e.g., 50th latest weight data) of the acceptable group of housings may be deleted from a storage area of the memory 81, and the other weight data may successively be shifted by one. In this case, the latest weight data of the acceptable group of housings is written in a storage area in which the second latest weight data of an acceptable group of housings has been stored.

A permissible value D, an absolute minimum reference weight $W_L$ and an absolute maximum reference weight $W_U$ are preliminarily stored in the memory 81. The memory 81 further includes a counter area for counting the successive occurrence of rejections, which will be described later.

Figure 10:
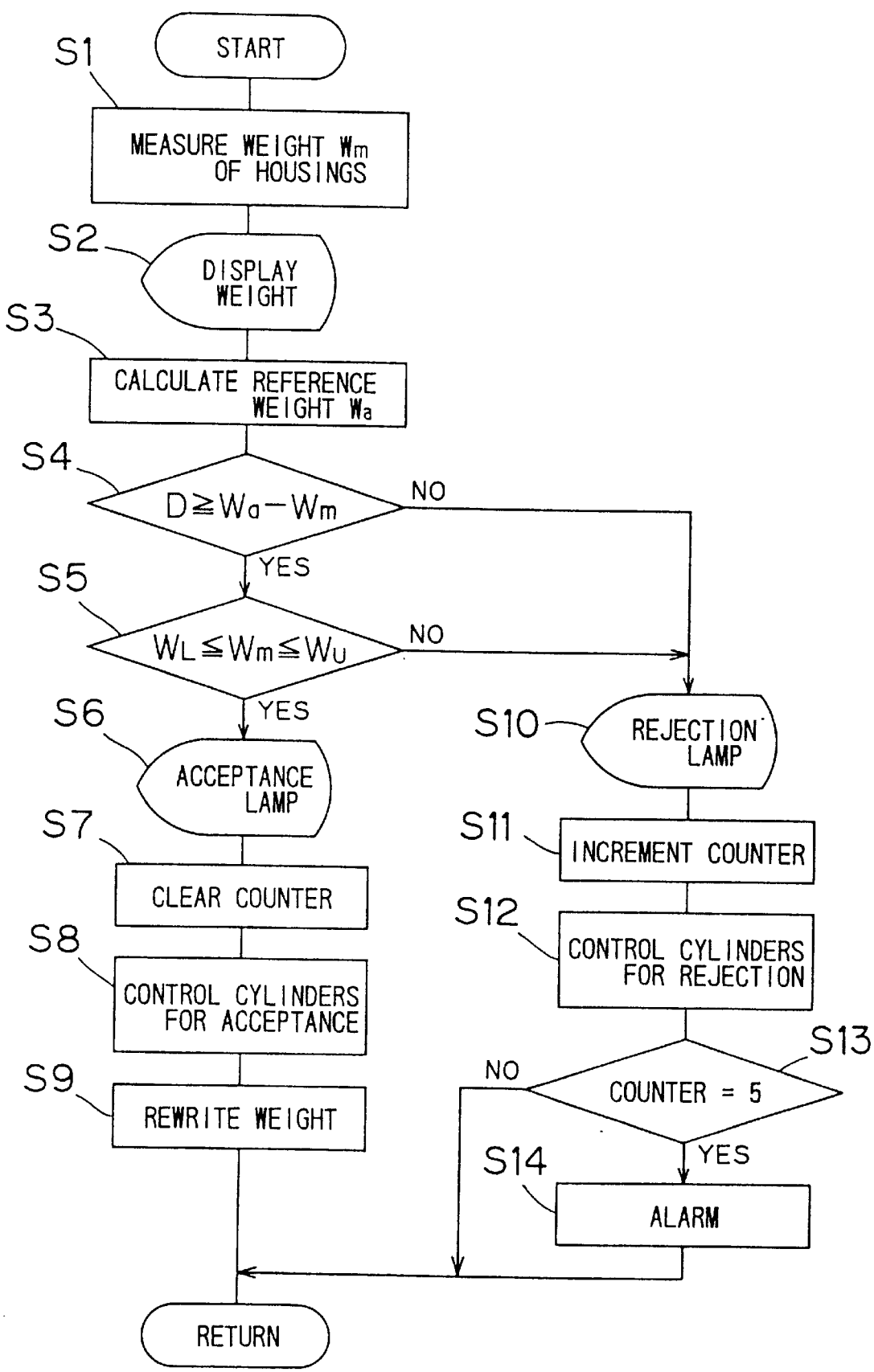
FIG. 10 is a flow chart illustrating a control process for a reference weight updating operation performed by a control section of the weight checker.

FIG. 10 is a flow chart illustrating a control process for housing acceptability judging operation and reference weight updating operation performed by the control section 60 shown in FIG. 7. Referring to FIG. 10, the control section 60 measures the weight Wm of housings based on a measurement signal applied from the scale plate 20 (step S1). The measured weight Wm is displayed on the numerical segment displays 162 of the display device 16 (step S2).

Then, the control section 60 calculates the reference weight Wa (step S3). Where weight data of acceptable groups of housings obtained in the past N weight checking operations are stored in the memory 81 as shown in FIG. 9, the reference weight Wa is determined by averaging these N weight data, i.e., by adding up the N weight data and dividing the addition value by N.

The control section 60 judges whether or not a difference between the reference weight Wa and the measured weight Wm is greater than the predetermined permissible value D (step S4). If the difference between the reference weight Wa and the measured weight Wm is not greater than the permissible value D, the control section 60 judges whether the measured weight Wm is not less than the predetermined absolute minimum weight $W_L$ and not greater than the predetermined absolute maximum weight $W_U$ (step S5). If YES in step S5, the molded housings are judged to be acceptable, and the acceptance lamp 163 of the display device 16 is lit (step S6).

Thereafter, the rejection counter for counting the successive occurrence of rejections is cleared (step S7). Then, an acceptance signal is applied to the cylinder driving circuit 68, and the left and right tray cylinders 50 and 51 and the left and right shutter cylinders 40 and 41 are controlled for driving (step S8).

Then, the weight data rewriting operation in the memory 81 is performed (step S9). The weight data rewriting operation is, as described above, an operation in which the weight data of the acceptable group of housings written into the memory 81 earliest is replaced with the weight data of the acceptable group of housings obtained in the latest weight checking operation.

On the other hand, if NO in step S4 or if NO in step S5, it is judged that the group of housings possibly includes a reject, and the rejection lamp 164 of the display device 16 is lit (step S10). Then, the rejection counter is incremented by one (step S11). In turn, a driving signal for rejection is applied to the cylinder driving circuit 68, whereby the group of housings judged to be rejective is put into the rejection box 18.

Next, it is judged whether the count value of the rejection counter reaches a predetermined value, e.g., "5" (step S13). The count value of the rejection counter reaching "5" indicates that five successive rejections have been detected. This means that an abnormal condition such as pin breakage has possibly occurred. In such an event, the abnormality alarming circuit 69 is activated to notify the occurrence of the abnormal condition (step S14).

If the count value of the counter is less than "5" in step S13, the process returns to step S1.

In step S9 of the control process shown in FIG. 10, the weight data which provide the basis of the calculation of the reference weight Wa are rewritten, as described above. The reason why the weight data are rewritten will be described in detail with reference to FIG. 11.

Figure 11:
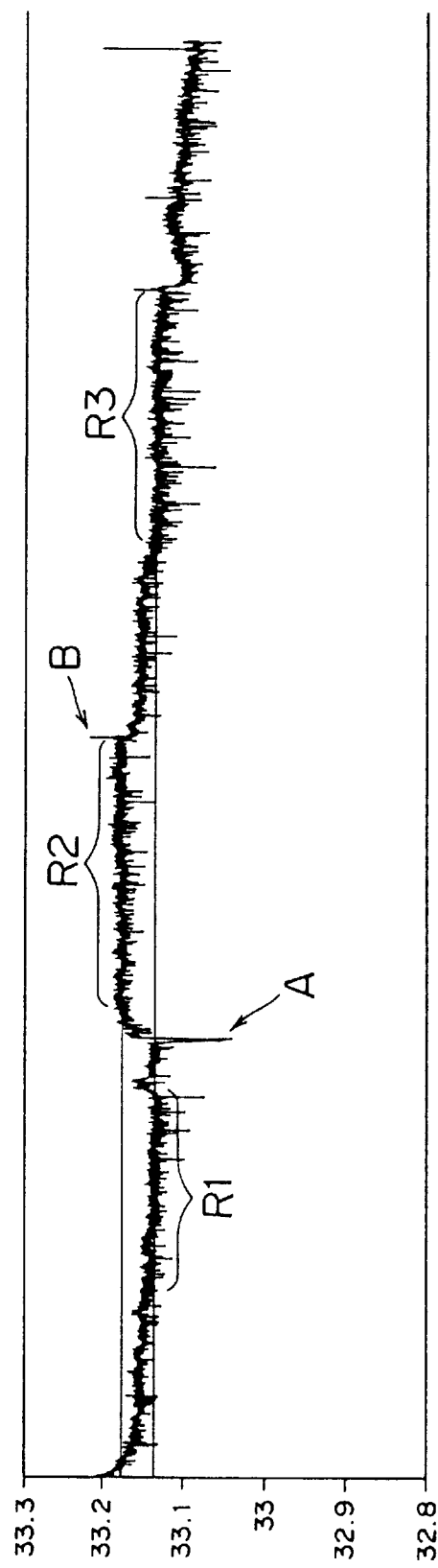
FIG. 11 is a graphical representation illustrating typical weight data of molded articles actually obtained by means of the weight checker.

FIG. 11 is a graphical representation illustrating typical weight data actually obtained by the weight checker in accordance with the embodiment shown in FIG. 1. In FIG. 11, the number of injection molding operations and the total weight of four molded articles (the weight of articles molded by way of the four-cavity mold) are plotted as abscissa and ordinate, respectively. As apparent from FIG. 11, the weight of the articles (the total weight of the four housings H) slightly varies for every molding operation. When the weight is extremely lighter (as indicated by arrow A in FIG. 11) or when the weight is extremely heavier (as indicated by arrow B in FIG. 11), a rejection judgment is typically made.

When viewed along the abscissa, the actually measured weight data shown in FIG. 11 indicates that the measured weight Wm fluctuates as the molding operation is repeatedly performed. For example, the average weight of a first group of acceptable housings molded in injection molding operations indicated by R1 is about 33.14 g, while the average weight of a second group of acceptable housings molded in injection molding operations indicated by R2 is 33.175 g. As can be understood therefrom, the weight of housings varies for every injection molding operation and fluctuates over time, even if the housings are acceptable. If the weight check is performed on the second group of housings by employing the same reference weight Wa as employed for the weight check of the first group of housings, for example, the difference between the measured weight Wm and the reference weight Wa is so large that the second group of housings may be judged to be rejective. Therefore, it is necessary to update the reference weight Wa in order to cope with the fluctuation of the weight of housings over injection molding operations.

This is why the weight rewriting is performed to update the reference weight Wa, which is calculated on the basis of the weight data stored in the memory 81, in step S9 of the control process shown in FIG. 10.

Instead of the weight rewriting, a new reference weight $_{new}Wa$ may be calculated from the following equation in step S9.

$$_{new}Wa = \{Wa \times (N-1) + Wm\}/N$$

This eliminates the need for providing storage areas in the memory 81 for storing therein N weight data of acceptable groups of housings.

In the control process shown in FIG. 10, the measured weight Wm is compared with the absolute minimum weight $W_L$ and the absolute maximum weight $W_U$. Therefore, the weight check is carried out on two steps by the comparison of the measured weight Wm with the reference weight (or average weight) Wa and the absolute weights $W_L$ and $W_U$, thereby ensuring a more accurate acceptability check.

The comparison of the measured weight with the absolute weights can be omitted as required.

In the foregoing embodiment, the rejection judgment does not necessarily conclude that the molded articles are all rejective, but means that the molded articles possibly include at least one reject. This is because the weight variation and measurement error make it difficult to judge the rejection on the basis of a measured weight alone. In the acceptability check by means of the weight checker in accordance with this embodiment, molded articles judged to be acceptable never include any reject. In other words, the reference value for acceptability check is determined such that the molded articles judged to be acceptable do not include any reject. Thus, acceptable molded articles can be automatically selected by mechanical means, so that acceptability check can be facilitated which has conventionally required significant labor of a lot of inspectors.

Even if the molded articles judged to be rejective include some acceptable molded articles, there is no problem. As previously stated, a very small number of molded articles are judged to be rejective. Therefore, an inspector can easily check the molded articles judged to be rejective to pick up acceptable molded articles therefrom.

In accordance with the present invention, where articles are molded by a so-called plural-cavity mold, the acceptability check is performed not on the respective molded articles, but on a group of plural articles molded at one time. Therefore, the molded articles judged to be acceptable are all acceptable, and a group of molded articles judged to be rejective may include some acceptable molded articles.

In the foregoing embodiment, the absolute weights are stored in the memory 81. The absolute weights may otherwise be variably set by way of dip switches by an operator at any time. In this case, the operator can, as required, change the absolute weights in accordance with the conditions of the molded articles.

In the foregoing embodiment, two absolute weights, i.e., the absolute minimum reference weight $W_L$ and absolute maximum reference weight $W_U$ are employed. Alternatively, a single absolute reference weight may be employed. In this case, when the measured weight is within a predetermined range with respect to the absolute reference weight, the molded articles are judged to be acceptable.

Though the foregoing embodiment takes as an example the case where the weight check is performed on an article group consisting of four wire harness connector housings molded at one time with a so-called four-cavity mold 6, the present invention is applicable to the weight check for various resin moldings, other than the connector housings, produced by injection molding process, and may be modified in accordance with the kind of resin moldings to be weighed.

In the present invention, six-cavity or eight-cavity mold can be employed as the mold 6 instead of the four-cavity mold.

Although the present invention has been described in detail by way of the embodiment thereof, it should be understood that the foregoing disclosure is merely illustrative of the technical principles of the present invention but not limitative of the same. The spirit and scope of the present invention are to be limited only by the terms of the appended claims.

What is claimed is:

1. A weight checker for measuring a weight of an injection-molded article and checking acceptability of the injection-molded article based on the measured weight, the weight checker comprising:

weight measuring means for measuring a weight of at least one article molded in a single injection molding operation;

storage means for storing therein a variable reference weight and an absolute reference value;

comparator means for comparing the weight of the at least one molded article measured by the weight measuring means with the variable reference weight to determine a difference therebetween and outputting the difference;

judging means for judging that the at least one molded article is acceptable if the difference output from the comparator means is within a predetermined permissible range, and judging that the at least one molded article is possibly rejective if the difference is out of the predetermined permissible range, the judging means further judging that the at least one molded article is possibly rejective, regardless of an output of the comparator means, if a difference between the weight measured by the weight measuring means and the absolute reference value is not less than a predetermined level; and updating means for updating the variable reference weight stored in said storage means, the updating means updating the variable reference weight into an average value which is determined by averaging a predetermined number N of weights of molded articles judged to be acceptable by said judging means from a latest measured weight to an N-th latest measured weight.

2. A weight checker as set forth in claim 1, wherein a plurality of articles having the same configuration are molded at one time in the single injection molding operation, wherein the weight measuring means measures a total weight of the plurality of articles molded at one time.

3. A weight checker as set forth in claim 2, wherein the judging means judges that the plurality of molded articles are all acceptable if the difference output from the comparator means is within the predetermined permissible range, and judges that the plurality of molded articles possibly include a reject if the difference is out of the predetermined permissible range.

4. A weight checker as set forth in claim 3 wherein said weight measuring means weighs, all at once, a total weight of the plurality of articles and said comparator means utilizes the total weight of the plurality of articles.

5. A weight checker as set forth in claim 1, wherein injection molding operations are successively repeated, the weight checker being adapted to operate in conjunction with the injection molding operations to allow the weight measuring means to measure the weight of the at least one article molded in a single injection molding operation and allow the judgment means to make a judgment on the basis of the measured weight before completion of a next injection molding operation.

6. A weight checker as set forth in claim 1, further comprising article classifying means for classifying molded articles in accordance with a judgment made by the judging means.

7. A weight checker as set forth in claim 1, wherein the updating means updates the reference weight every time the judging means makes a judgment that the at least one molded article is acceptable.

8. A weight checker as set forth in claim 1, wherein:

said storage means has a predetermined plural number of storage areas; and said updating means includes;

write-in means for writing into a storage area of the storage means a weight of at least one article which is judged to be acceptable by the judging means; and calculation means for averaging weights of molded articles stored in the respective storage areas of the storage means and outputting a thus obtained average as the variable reference weight.

9. A weight checker as set forth in claim 8, wherein, when the plural storage areas are all occupied by the weights of the molded articles written therein, the write-in means rewrites a weight stored earliest in a storage area with a weight of at least one molded article lastly judged to be acceptable.

10. A weight checker as set forth in claim 1, wherein the injection molding operation is performed by a production facility including a mold for molding articles and an injection molding machine for injecting a resin material into the mold, the weight checker further comprising transportation means provided below the mold for transporting the at least one molded article dropping out of the mold to the weight measuring means.

11. A weight checker as set forth in claim 1, wherein the weight measuring means includes a scale face on a top surface thereof for measuring a load applied onto the scale face, the weight checker further comprising:

a tray disposed above the scale face of the weight measuring means for receiving the at least one injection-molded article; and tray moving means adapted to retain the tray in an initial position spaced apart from the scale face of the weight measuring means when the at least one molded article is placed on the tray and thereafter lower the tray onto the scale face.

12. A weight checker as set forth in claim 11, wherein the tray moving means including:

a first tilting means for tilting the tray in a predetermined first direction in response to a judgment made by the judging means that the at least one molded article is acceptable;

a second tilting means for tilting the tray in a predetermined second direction different from the first direction in response to a judgment made by the judging means that the at least one molded article is possibly rejective; and return means for returning the tray to the initial position after the tray is tilted.

13. A weight checker as set forth in claim 11, further comprising:
a windshield surrounding at least the tray and the weight measuring means;
the windshield formed with two windows for passing therethrough the at least one molded article sliding out of the tray when the tray is tilted; and
the windows respectively provided with shutters for opening the windows in conjunction with the tilt of the tray.

14. A weight checker as set forth in claim 11, further comprising:
transportation means for transporting the at least one injection molded article to the tray,
wherein the tray moving means moves the tray in conjunction with an injection molding cycle.

15. A weight checker as recited in claim 1 further comprising an increment counter for counting a number of possible rejective molded article judgments rendered by said judging means.

16. A weight checker as recited in claim 15 further comprising an alarm unit which activates upon the increment counter reaching a predetermined number.

17. A weight checker as recited in claim 15 further comprising a counter clearer which re-initiates the count of said increment counter upon an acceptance by said judging means discontinuing a successive occurrence of rejections counted by said increment counter.

18. A method for judging whether an injection-molded article is acceptable or rejective, comprising the steps of:
measuring a weight of at least one article molded in a single injection molding operation;
comparing the measured weight with a predetermined variable reference weight;
judging that the at least one molded article is acceptable if a difference between the measured weight and the reference weight is within a predetermined permissible range;
judging that the at least one molded article is possibly rejective if the difference between the measured weight and the reference weight is out of the predetermined permissible range;
updating the variable reference weight into an average value which is determined by averaging a predetermined number N of weights of molded articles judged to be acceptable from a latest measured weight to an N-th latest measured weight; and
judging that the at least one molded article is possibly rejective when a difference between the weight measured in the weight measuring step and a predetermined absolute reference value is not less than a predetermined level, regardless of a comparison result in the comparing step.

19. A method as set forth in claim 18, further comprising the step of classifying molded articles into acceptable articles and rejective articles on the basis of a judgment result.

20. A method as set forth in claim 18,
wherein the updating step includes updating the reference weight on condition that the molded article is judged to be acceptable.

21. A method as set forth in claim 18,
wherein a plurality of articles having a same configuration are molded at one time in the single injection molding operation,
wherein the weight measuring step includes measuring a total weight of the plurality of articles molded at one time,
wherein the acceptance judgment step includes judging that the plurality of weighed molded articles are all acceptable,
wherein the rejection judgment step includes judging that the plurality of weighed molded articles possibly include a reject.

22. A method as set forth in claim 18, further comprising the step of classifying molded articles on the basis of a judgment result indicating whether the at least one molded article is acceptable or possibly rejective.

23. A weight checker for measuring a weight of an injection-molded article and checking acceptability of the injection-molded article based on the measured weight, the weight checker comprising:
weight measuring means for measuring a weight of at least one article molded in a single injection molding operation;
comparator means for comparing the weight of the at least one molded article measured by the weight measuring means with a predetermined reference weight to determine a difference therebetween and outputting the difference;
judging means for judging that the at least one molded article is acceptable if the difference output from the comparator means is within a predetermined permissible range, and judging that the at least one molded article is possibly rejective if the difference is out of the predetermined permissible range;
storage means having a predetermined plural number of storage areas;
write-in means for writing into a storage area of the storage means a weight of at least one article which is judged to be acceptable by the judging means; and
calculation means for averaging weights of molded articles stored in the respective storage areas of the storage means and outputting a thus obtained average as the reference weight, and
wherein, when the plural storage areas are all occupied by the weights of the molded articles written therein, the write-in means rewrites a weight stored earliest in a storage area with a weight of at least one molded article lastly judged to be acceptable.

24. A weight checker for measuring a weight of an injection-molded article and checking acceptability of the injection-molded article based on the measured weight, the weight checker comprising:
weight measuring means for measuring a weight of at least one article molded in a single injection molding operation;
comparator means for comparing the weight of the at least one molded article measured by the weight measuring means with a predetermined reference weight to determine a difference therebetween and outputting the difference;
judging means for judging that the at least one molded article is acceptable if the difference output from the comparator means is within a predetermined permissible range, and
wherein the weight measuring means includes a scale face on a top surface thereof for measuring a load applied onto the scale face,
the weight checker further comprising:
a tray disposed above the scale face of the weight measuring means for receiving the at least one injection-molded article;

tray moving means adapted to retain the tray in an initial position spaced apart from the scale face of the weight measuring means when the at least one molded article is placed on the tray and thereafter lower the tray onto the scale face, and wherein the tray moving means includes:

a first tilting means for tilting the tray in a predetermined first direction in response to a judgment made by the judging means that the at least one molded article is acceptable;

a second tilting means for tilting the tray in a predetermined second direction different from the first direction in response to a judgment made by the judging means that the at least one molded article is possibly rejective; and return means for returning the tray to the initial position after the tray is tilted.

25. A weight checker for measuring a weight of an injection-molded article and checking acceptability of the injection-molded article based on the measured weight, the weight checker comprising:

weight measuring means for measuring a weight of at least one article molded in a single injection molding operation;

comparator means for comparing the weight of the at least one molded article measured by the weight measuring means with a predetermined reference weight to determine a difference therebetween and outputting the difference;

judging means for judging that the at least one molded article is acceptable if the difference output from the comparator means is within a predetermined permissible range, wherein a plurality of articles are molded at one time in the single injection molding operation, wherein the weight measuring means measures, all at once, a total weight of the plurality of articles molded at one time, and wherein the comparator means compares the total weight of the plurality of articles molded at one time with the predetermined weight, and said judging means judges that the plurality of molded articles are all acceptable if the difference output from the comparator means is within the predetermined permissible range and judges that the plurality of molded articles possibly include a reject if the difference is out of the predetermined permissible range.

26. A weight checker as recited in claim 25 wherein said weight measuring means includes a scale face for measuring a load applied onto the scale face, and said weight checker further comprising a tray dimensioned for receiving the plurality of articles molded at one time, and tray moving means adapted to retain the tray in an initial position spaced apart from the scale face when the plurality of articles are placed on the tray and thereafter lower the tray and plurality of articles onto the scale face.

27. A method for judging whether an injection-molded article is acceptable or rejective, comprising the steps of:

measuring, all at once, a weight of a group of articles molded in a single injection molding operation;

comparing the measured weight with a predetermined reference weight;

judging that the group of molded articles are acceptable if a difference between the measured weight and the reference weight is within a predetermined permissible range;

judging that the at least one molded article within the group of molded articles is possibly rejective if the difference between the measured weight and the reference weight is out of the predetermined permissible range.

28. A method as recited in claim 27 further comprising supplying the group of molded articles to a support tray while said tray is free from contact with a weight measuring scale, and lowering the tray into contact with the weight measuring scale after all of the group of articles is received by said tray such that the weight of the group of articles can be calculated.

29. A method as recited in claim 28 further comprising dumping from the tray articles within the group of articles supported on the tray to a common rejection location when judging determines that at least one molded article within the group is possibly rejective, and dumping from the tray all articles within the group of articles supported on the tray to a common acceptance location when judging determines that the group of molded articles are acceptable.

30. A method as recited in claim 27 further comprising counting a succession of successive judgments that at least one article within the group of molded articles is out of the predetermined permissible range and signaling a warning when the number of successive, possibly rejective judgments reaches a predetermined number.

* * * * *